Patented Sept. 24, 1940

2,215,453

UNITED STATES PATENT OFFICE 2,215,453

METHOD FOR THE MANUFACTURE OF STERILIZED CATGUT

János Buchgraber, Budapest, Hungary, assignor to Jenö Rakonitz, Budapest, Hungary No Drawing. Application October 7, 1938, Serial No. 233,801. In Hungary November 4, 1937

4 Claims. (Cl. 128—335.5)

It is a well-known fact that the problem of perfect sterilization of wound-sewing material made of animal gut cannot be considered as totally solved. Numerous chemical methods have been suggested for this purpose of which the iodine processes were the most successful. For heat-sterilization, the use of dry-air, paraffine or other oils or superheated alcohol vapour are generally preferred. High temperature and prolonged heating, necessary for the destruction of bacterial spores resistant to heat, may considerably harm the mechanical properties of the catgut, and chemical processes may also be harmful in a similar sense.

I have found that even raw catgut—such catgut infected by bacteria-forming spores of great resistance, and having been purposely used by me in my experiments—can be completely sterilized without harming its mechanical properties, by the following methods: (a) the catgut wound on a star-shaped bobbin, or wound into a ball, is kept in a bath of alkyene-oxides of a temperature of about 100 to 120 centigrade for one or more hours, (b) the catgut is exposed to vapours of alkylene-oxides or di-alkylene oxides, dioxan-vapour for instance, advantageously at a temperature of approximately 100 to 105 centigrade, (c) the catgut is kept for several hours in dioxan superheated to from 107 to 110 centigrade, or in the vapour-atmosphere thereof, (d) a mixture of alkylene-oxides or di-alkylene oxides is used as in the preceding cases, (a), (b), and (c). Generally, any alkylene-oxide or di-alkylene oxide is suitable for carrying out the method described above, but dioxan boiling at a temperature of 100.5 centigrade has proved to be the most efficient.

A great advantage of the method elaborated by me is that alkylene-oxides possessing considerable steam-pressure, are easily removed from the catgut without leaving any residue, even at an ordinary temperature. The method can be applied to catgut wound on star-shaped holders of the usual type, or wound on glass-forks. Thus, after sterilization in the said manner, the liquid is removed from the material, by suction for instance, and the catgut on holders ready for use may be packed direct into boxes.

*Example No. 1.*—Catgut wound on star-shaped holders of the usual type is boiled in boiling dioxan, from 30 minutes to 5 hours. The operation is advantageously effected in a vessel of glass, porcelain or enameled metal, and provided with a counter-stream cooler. When the boiling is completed, the liquid, cooled to about 70 centigrade, is removed (syphoned off) and the sterile filaments are kept in a vacuum, until they have completely cooled, whereafter they are asceptically packed into sterile boxes.

*Example No. 2.*—The filaments are kept for 1 to 3 hours in an autoclave in ethylene-oxide-vapour superheated to 105 centigrade, and the gases are, while cooling, removed by suction.

*Example No. 3.*—Catgut is heated in dioxan-vapour for 1 to 2 hours to 108 to 110 centigrade, then, while cooling, the liquid is removed (syphoned off) from the closed vessel, and finally the vapours are sucked off.

*Example No. 4.*—Catgut is heated for 2 to 4 hours in propylene-oxide to 110 centigrade and the procedure is continued as in Example No. 1.

*Example No. 5.*—In accordance with the preceding examples, catgut is sterilized in a mixture of dioxan-propylene-oxide at 105, 110, 115 or 120 centigrade.

Having now particularly described and ascertained the nature of my said invention, and in what manner the same is to be performed, I declare that what I claim is:

1. A method for the manufacture of sterilized catgut which consists in heating the raw filaments to from 100 to 120 degrees centigrade in the presence of di-alkylene compounds in which both alkylene radicals are combined with oxygen.

2. A method for the manufacture of sterilized catgut which consists in heating the raw filaments to from 100 to 120 degrees centigrade in the presence of dioxan.

3. A method for the manufacture of sterilized catgut which consists in treating the raw filaments with the vapour of dioxan.

4. A method for the manufacture of sterilized catgut which consists in treating the raw filaments with the superheated vapour of dioxan.

JANOS BUCHGRABER.